United States Patent Office 3,700,558
Patented Oct. 24, 1972

3,700,558
PRODUCTION OF L-TRYPTOPHAN BY FERMENTATION
Josef Ernst Thiemann, Como, and Hermes Pagani, Milan, Italy, assignors to Gruppo Lepetit S.p.A., Milan, Italy
No Drawing. Filed Nov. 18, 1968, Ser. No. 776,784
Claims priority, application Italy, Nov. 20, 1967, 22,882/61
Int. Cl. C12d 13/06
U.S. Cl. 195—29                                            6 Claims

ABSTRACT OF THE DISCLOSURE

The invention is concerned with the improved production of L-tryptophan by fermentation of a microorganism named S-10 (ATCC No. 21,336), obtained by mutation of *Bacillus subtilis*. The yields obtained, particularly on synthetic medium, are much higher than those described in previous processes of L-tryptophan production.

---

The present invention relates to the production of L-tryptophan by fermentation. More particularly, the invention relates to an improved process of fermentation by which L-tryptophan is produced in high yields, never obtained up to now through economically acceptable processes.

L-tryptophan is a substance of great nutrient importance as an essential aminoacid. Its deficiency causes serious pathologic conditions. However, for many years, it was not possible to produce L-tryptophan by industrially useful processes. The preparation of amino acids by fermentation is not yet carried out industrially except for a limited number of cases, mostly because the microorganisms do not accumulate aminoacids in significant amounts. For some aminoacids the accumulation has been achieved using auxotropic mutants; but for L-tryptophan this accumulation has never been obtained. The non-accumulation of aminoacids by microorganisms has been explained by the presence of feedback systems, which limit the production of aminoacids to the amount required by the cells.

To obtain de-repressed mutants, that is, mutants in whose presence L-tryptophan does not inhibit the enzymatic systems involved in its formation, colonies resistant to tryptophan antimetabolites were isolated. (H. A. Adelberg, J. Bacteriol. 76 326, 1958)

Also the addition of precursors to the fermentation medium, as for instance indolepyruvic acid, indole, indolelactic acid, and anthranilic acid have been described in previous publications and patents; but improvements of yield achieved through these procedures are limited to a rather low percentage.

We have now found that by fermenting a microorganism obtained by mutation of *Bacillus subtilis* and using a fermentation medium containing as precursor one of the compounds anthranilic acid and indole, yields of L-tryptophan much higher than those known up to now are obtained.

The microorganism, obtained by mutation of *Bacillus subtilis* and indicated by us with the abbreviation S-10, which has received ATCC accession No. 21,336, can produce L-tryptophan in the common media suitable for the fermentation by microorganisms. This medium can contain natural or artificial sources of carbon and nitrogen. However it has been surprisingly ascertained that higher yields of L-tryptophan are obtained in the so-called synthetic media, that is, lacking in natural substances as for instance: peptone, yeast extract, beef extract, corn steep liquor, etc. This result is new and is one of the characteristics of the present invention. As a matter of fact, it is known that the synthetic media are more economical. Therefore the combination, in our process, of a microorganism, new producer of L-tryptophan, with the use of a synthetic medium of low cost, makes our process particularly advantageous in respect of industrial production.

The process, which is more particularly described in the following examples, consists in fermenting for 24–96 hours, under aerobic conditions, a strain of the mutant S-10 in a culture medium containing an assimilable source in the form of indole or anthranilic acid, at a pH between about 5 and 8 and at a temperature between 20 and 40° C. At the end of the fermentation the yields which are obtained range from 1,500 to 11,000 γ/ml. and more, according to the composition of the medium and the selected conditions of time and temperature.

The mutant S-10 has been obtained as follows, using 5-methyltryptophan (5-MT), a tryptophan homologue not incorporated into the bacterial proteins, but which represses the formation of the enzymes involved in the synthesis of tryptophan.

Ten ml. of synthetic medium M 40, containing 200 γ/ml. of 5-MT were added to a Petri dish (9 mm. diameter). Then a second layer composed of 2.5 ml. of the same medium, 2 ml. of a bacterial suspension of *Bacillus subtilis and* 0.5 ml. of a solution containing 1000 γ/ml. of 5-MT were added. After incubation of 28° C. colonies resistant to 5-MT appeared, some of which formed a halo of satellite growth of non-resistant bacteria. The colonies, which formed the satellite growth, are mutants able to accumulate L-tryptophan into the culture medium. From these resistant mutants the culture S-10, which is used for the process of the present invention, is selected.

The synthetic medium M 40 has the following composition:

|   | G. |
|---|---|
| $KH_2PO_4$ | 0.1 |
| $MgSO_4 \cdot 7H_2O$ | 0.05 |
| $(NH_4)_2SO_4$ | 0.35 |
| Asparagine | 0.15 |
| Glucose | 1 |

Tap water to 100 ml.

EXAMPLE 1

A culture of S-10 is rinsed from an agar slant and used to inoculate 100 ml. of nutrient medium having the following composition:

|   | G. |
|---|---|
| Glucose | 8 |
| $KH_2PO_4$ | 0.1 |
| $MgSO_4 7H_2O$ | 0.05 |
| $(NH_4)_2SO_4$ | 0.35 |

Tap water to 100 ml.

The pH, adjusted to 7.0 by addition of NaOH, falls to 6.7 after sterilization. The microorganism is allowed to grow for 24 hours at 28° C., then is poured into 4 liters of a nutrient medium of the same composition and contained in a glass fermentor. The fermentation vessel is kept at 28° C., stirred at 800 r.p.m. and aerated at a rate of 1 v./v./m. The pH is controlled by periodic addition of sterile $CaCO_3$, and maintained at 6.0–6.5.

At hourly intervals, starting from the 24th hour, 25 γ/ml. of anthranilic acid are added. After 72 hours of fermentation 1675 γ/ml. of L-tryptophan have accumulated, which is isolated by the standard procedures of charcoal adsorption and elution.

EXAMPLE 2

The process of Example 1 is repeated using the same nutrient medium. The fermentation medium, inoculated with the strain S–10, is treated under the same conditions of Example 1. After 24 hours of fermentation and at hourly intervals, 25 γ/ml. of anthranilic acid and 30 γ/ml. of L-tryptophan have accumulated.

EXAMPLE 3

A culture of S–10 is rinsed from an agar slant and used to inoculate 100 ml. of nutrient medium of the composition indicated in Example 1. After 24 hours at 28° C. the medium is transferred into a vessel containing 4 liters of the same medium. The culture is stirred at 800 r.p.m. and aerated at a rate of 1 v./v./m. After 24 hours 5% of the volume of the pre-culture is transferred into a vessel containing a medium of the following composition:

| | G. |
|---|---|
| Glucose | 7 |
| $(NH_4)_2SO_4$ | 0.7 |
| $KH_2PO_4$ | 0.2 |
| $MgSO_4 7H_2O$ | 0.5 |
| Tap water to 100 ml. | | pH after sterilization 6.7.

The conditions of culture are identical to those of the pre-culture, except that the pH is maintained at 5.8–6 by addition of $CaCO_3$. After 16 hours of growth the precursor indole is added every hour at the times and quantities indicated in the following table.

Rates of indole addition

| Hours: | γ/ml. |
|---|---|
| 16–19 | 100 |
| 20–24 | 150 |
| 25–31 | 125 |
| 32–42 | 100 |
| 43–45 | 150 |
| 48–62 | 100 |
| 68–69 | 100 |
| 80–86 | 60 |

At the different hours the concentration of L-tryptophan in the medium was that indicated in the following table.

Assay of tryptophan

| Hours: | γ/ml. |
|---|---|
| 16 | 57 |
| 24 | 1826 |
| 36 | 4460 |
| 48 | 6452 |
| 60 | 7444 |
| 72 | 9296 |
| 84 | 9064 |
| 96 | 10380 |

We claim:
1. A process for the production of L-tryptophan, which consists in fermenting, under aerobic conditions for 24–96 hours, a mutant of *Bacillus subtilis*, identified by the ATCC No. 21336, in a synthetic culture medium containing an assimilable source of carbon, an assimilable source of nitrogen, mineral salts and a precursor compound in the form of indole or anthranilic acid, and recovering the formed L-tryptophan.

2. A process as in claim 1, wherein the fermentation is carried out in a synthetic medium composed of monopotassium acid phosphate, magnesium sulfate, ammonium sulfate, asparagine and glucose in water.

3. A process as in claim 1, wherein the pH of the fermentation medium is maintained between about 5 and 8 throughout the fermentation.

4. A process as in claim 1, wherein the fermentation is carried out at a temperature between 20 and 40° C.

5. A process as in claim 2, wherein the pH of the fermentation medium is maintained between about 5 and 8 throughout the fermentation.

6. A process as in claim 1, wherein the fermentation is carried out at a temperature between 25 and 30° C.

References Cited

UNITED STATES PATENTS

| 3,293,141 | 12/1966 | Mateles et al. | 195—29 |
| 3,385,762 | 6/1965 | Okazaki | 195—29 |

OTHER REFERENCES

"Chemical Abstracts," vol. 57: 17219c, 1962.
Gumsalas et al.: The Bacteria, vol. III, p. 237 (1962).

A. LOUIS MONACELL, Primary Examiner

M. D. HENSLEY, Assistant Examiner